Figure 1:
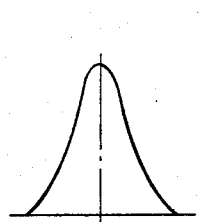
Figure 1:
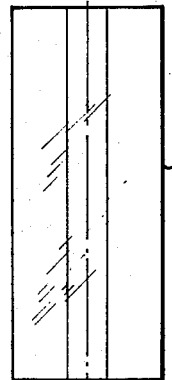

United States Patent

Bergqvist

[15] 3,689,850
[45] Sept. 5, 1972

[54] DEVICE FOR NEUTRALIZING TEMPERATURE DEPENDENT GAIN VARIATIONS IN AN OPTICALLY PUMPED LASER ROD

[72] Inventor: Erik Arne Bergqvist, Karlskoga, Sweden

[73] Assignee: Aktiebolaget Bofors, Bofors, Sweden

[22] Filed: April 23, 1970

[21] Appl. No.: 31,261

[30] Foreign Application Priority Data

May 6, 1969 Sweden ..................6422/69

[52] U.S. Cl. ..............................331/94.5
[51] Int. Cl. ..............................H01s 3/00
[58] Field of Search ....................331/94.5

[56] References Cited

UNITED STATES PATENTS

| | | |
|---|---|---|
| 3,055,257 | 9/1962 | Boyd et al..................331/94.5 |
| 3,476,463 | 11/1969 | Kreuzer......................350/189 |
| 3,484,715 | 12/1969 | Rempel.....................331/94.5 |
| 3,478,608 | 11/1969 | Met.......................331/94.5 X |

Primary Examiner—Ronald L. Wibert
Assistant Examiner—Edward S. Bauer
Attorney—Hane, Baxley & Spiecens

[57] ABSTRACT

The mirror system of a resonator for a solid state laser includes a totally reflecting prism the principal section of which is a right-angled isosceles triangle and which has its hypotenuse side facing one end of the laser rod so that an incident beam from the laser is reflected back into the laser rod in parallel with the direction of incidence. A temperature sensitive device senses the temperature in the neighborhood of the laser rod and actuates the prism so that its 90° corner is displaced in relation to the center axis of the laser rod in response to temperature changes to cause a reflected beam to travel through a part of the laser rod having an excitation level appropriate for the desired optical gain.

4 Claims, 4 Drawing Figures

PATENTED SEP 5 1972 3,689,850

DEVICE FOR NEUTRALIZING TEMPERATURE DEPENDENT GAIN VARIATIONS IN AN OPTICALLY PUMPED LASER ROD

BACKGROUND OF THE INVENTION

The invention relates to a method and means for controlling the amplification in a laser having a solid laser body, and more particularly the invention relates to a method and means for providing a neutralization of the temperature dependent gain variation in the laser material.

A laser crystal is strongly influenced by temperature and this particularly applies to a ruby laser. This depends on the atomic properties of the laser crystal. Thus, the duration of the metastable state in the laser crystal decreases with increasing temperature at the same time as the amplification of the stimulated emission ("the laser action") decreases. For this reason a high excitation energy (pumping energy) is required at high temperatures. If the laser is to operate within a large temperature range, e.g. from $-50°$ to $+60°$ C., and the excitation energy is chosen sufficiently large to make the laser work satisfactorily at the upper limit of the temperature range, this excitation energy will be high at low temperatures. This causes difficulties particularly in Q-pulsed lasers, since, due to the high gain at low temperatures, double pulses are produced if the applied pumping energy is high. In order that single pulses shall be obtained which is particularly desirable if the laser is used for distance measuring purposes, the pumping energy at low temperatures can be decreased, but the single pulses then obtained will have a low energy. In order that single pulses having a high energy shall be obtained even at low temperatures the optical gain of the laser must be decreased in relation to the gain at higher temperatures.

An object of the present invention is to provide a control of the optical amplification of a laser and particularly such a control that the optical amplification decreases with decreasing temperature. The invention relates to a laser of the kind comprising a solid laser body and a resonator with a mirror system for reflecting radiation emitted by the laser body back into the laser body, the laser being pumped by means of an optical pumping system.

SUMMARY OF THE INVENTION

The invention utilizes the fact that the excitation level produced by the pumping with an optical pumping system is different in different parts of the laser body. In most lasers with optical pumping systems the distribution of excited atoms in the laser rod is such that the center of the rod is excited to the highest degree, while the excitation level adjacent to the surface of the rod is barely sufficient to cause laser action. The distribution of the excitation in the laser rod is determined by the geometry of the pumping system and of the degree of doping of the laser material. If for instance, the pumping system is provided with an elliptical reflector and the laser rod is arranged with its center axis coinciding with one focal line of the reflector and a rod-shaped pumping lamp is arranged along the other focal line of the reflector, the excitation level will decrease nearly uniformly from a maximum at the center of the rod in all directions radially towards the surface of the rod.

The excitation level determines the optical gain and therefore this will vary within the laser body in the same sense as the excitation level. According to the invention this fact is utilized by actuating mechanically the mirror system of the resonator so that beams radiated from the laser body after reflection in the mirror system returns to such parts of the laser body which have an excitation level suited to the desired gain. In a preferred embodiment of the invention the mirror system is actuated automatically in response to the temperature of the environment of the laser body so that the gain is decreased with decreasing temperature.

In Q-pulsed lasers the totally reflecting mirror of the resonator usually consists of a fixed or rotatable prism the principal section of which is a right-angled isosceles triangle. Such a prism is also known as the Porroprism. By means of such a prism a gain control according to the invention can be easily effected by making the prism movable so that its 90° corner can be displaced at right angles to the longitudinal direction of the laser rod whereby a variation of the optical gain is obtained as will be described more in particular in the following. The displacement of the prism can be effected by means of actuating members which are controlled by temperature sensitive devices so that the gain is varied in accordance with the temperature.

DRAWINGS AND DETAILED DESCRIPTION

The invention will be described more in particular with reference to the accompanying drawing.

Figure 2:
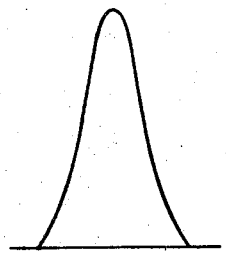
Figure 2:
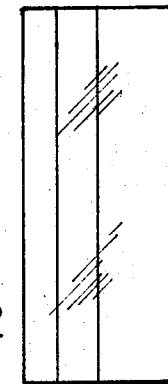

FIGS. 1 and 2 schematically illustrate the principle of the invention.

Figure 3:
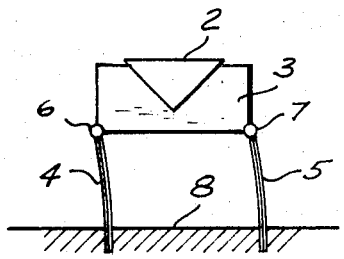
Figure 4:
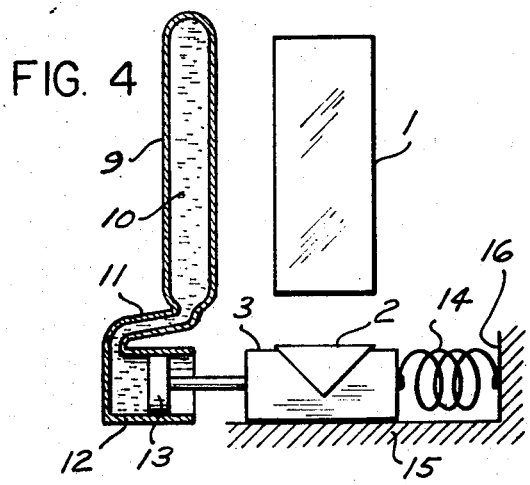

FIGS. 3 and 4 show schematically two different devices for automatically controlling the gain of the laser in response to the temperature.

FIGS. 1 and 2 show a laser rod 1, which may consist of e.g. a rod-shaped ruby. At one end of the laser rod 1 is located a totally reflecting prism 2 of the kind described above. The other elements belonging to a complete laser system such as pumping system and the semi-transparent mirror arranged at the other end of the laser rod are assumed to be of well-known design, and therefore they have not been shown in the drawing.

Above the laser rod 1 in FIGS. 1 and 2 there is a diagram diagram showing how the excitation level and hence the optical gain varies along the cross section of the laser rod. As will be seen from this diagram the excitation has a maximum along the center axis of the laser rod and decreases practically symmetrically with increasing distance from the center line.

In FIG. 1 the prism 2 is shown having its 90° corner situated at the extension of the center axis of the laser rod 1, i.e. the 90° corner registers with the excitation maximum in the laser rod. When the prism 2 is in this position in relation to the laser rod 1 a beam emitted from the laser rod will be reflected by the prism 2 into the laser rod along a path in which the excitation level is about the same as in the path of travel of the outgoing beam through the laser rod. Hereby a maximum optical gain is obtained in the laser rod. If the laser operates at a high temperature the prism 2 should therefore assume the position shown in FIG. 1 in relation to the laser rod 1 in order that the laser shall operate satisfactorily with the lowest possible pumping energy.

However, in the case of low temperatures the position of prism 2 as shown in FIG. 1 causes the optical gain to be so high that double pulses are generated by the laser at unchanged pumping energy. Single pulses can be obtained by reducing the pumping energy but in such case the generated single pulses will have too low an energy.

According to the invention the optical gain at low temperatures is decreased by displacing the prism 2 so that its 90° corner is no longer registering with the excitation center. This is illustrated in FIG. 2 in which prism 2 is shown in such position that its 90° corner is situated at a perpendicular distance d from the excitation center in the laser rod 1.

When total reflection occurs in a prism of the shown kind the reflected beam will be parallel to the incident beam. The distance between the incident and the reflected beam is determined by the distance between the incident beam and the 90° corner of the prism and is equal to twice the said distance. The displacement of the prism in relation to the excitation center of the laser rod as shown in FIG. 2 consequently causes a beam which passed through the excitation center before entering the prism to return after reflection in the prism through a path in the laser rod 1 having a lower excitation. The amplification of the light upon the double passage through the laser rod (this amplification being proportional to the product of the amplifications upon the two single passages) in this case is lower than in the case when the 90° corner of the prism registers with the excitation center of the laser rod. This decrease of the amplification makes it possible to generate single pulses having a high energy even at low temperatures.

In order to fulfil the requirements of a low pumping energy at high temperatures and a high energy of single pulses at low temperatures the position of the prism 2 must vary with temperature. To this end the prism 2 may be mounted in a holder which can be displaced e.g. manually by means of a screw device. However, the required change of position of the prism 2 in response to the temperature may also be effected automatically by means of suitable temperature sensitive means. FIGS. 3 and 4 show examples of such means.

In the device shown in FIG. 3 the prism 2 is mounted in a holder 3 which is suspended at joints 6 and 7 in two bimetallic springs 4 and 5 which are attached to a fixed base 8. The arrangement is such that the prism 2 assumes the position shown in FIG. 1 in relation to the laser rod at the maximum temperature at which the laser is intended to operate. When the temperature decreases the bimetallic springs 4 and 5 are bent so that the prism 2 is carried away from this position.

In the arrangement shown in FIG. 4 the prism 2 is likewise mounted in a holder 3 which can slide on a fixed support 15. An elongated container 9 is mounted adjacent to the laser rod 1. This container 9 is filled with a liquid 10 which preferably is mercury. The container 9 communicates through a tube 11 with a cylinder 12 in which a piston 13 is slidably mounted, the piston rod being connected to the prism holder 3. A pressure spring 14 is arranged between one end of the prism holder 3 and a fixed support 16. When the temperature is changed the volume of liquid 10 is also changed whereby the prism holder 3 will be displaced under the action of piston 13 and spring 14. In semicontinuous operation when the temperature of the laser rod may appreciably exceed the ambient temperature, the container 9 should preferably be located near to the laser rod 1, whereby the temperature of the laser rod can be better sensed than by the device shown in FIG. 3.

In Q-pulsed lasers the totally reflecting prism 2 is often used for the pulsing in which case the prism is caused to rotate about an axis at right angles to the 90° vertex of the prism. In this case the drive means for causing the prism to rotate may be mounted together with the prism on a suitable holder which is displaced in response to the temperature in the manner described above.

The means for displacing the prism in response to temperature changes may of course be designed in many other ways than those illustrated in FIGS. 3 and 4.

What is claimed is:

1. A device for controlling the amplification in a laser system including an elongated solid laser body of the kind in which the excitation level produced by optical pumping action varies along the cross-section of the laser body, said device comprising: a prism adjacent one end of the laser body for reflecting radiation emitted from the laser body back into the laser body, said prism having a principal section which is a right-angled isosceles triangle; and actuating means for transversely moving said prism so that its 90° corner is displaced along a line which is at right angles to the center line of the laser body and which is at right angles to said corner, said actuating means comprising a temperature sensitive means sensitive to the temperature in the environment of the laser body for moving said prism so that the 90° corner thereof moves along said line in response to this temperature to neutralize the temperature dependent gain variations.

2. A device as claimed in claim 1 wherein the actuating means including the temperature sensitive means is so arranged that at a relatively high temperature in the environment of the laser body the prism is kept in such position that its 90° corner is opposite a range of maximum excitation in the laser body and upon increasing temperature is transversely moved from this position.

3. A device as claimed in claim 1 wherein said temperature sensitive means comprises a bimetallic element connected to said prism in such a way that when said bimetallic element changes shape in response to changes in temperature in the environment of the laser body the 90° corner of said prism moves transversely along said line.

4. A device as claimed in claim 1 wherein said temperature sensitive means comprises a container for a liquid whose volume is a function of temperature, a piston device connected to said container and moved by the liquid when the volume of the liquid is changed with temperature changes, and means connecting said piston to said prism for moving the 90° corner thereof along said line as said piston is moved by the liquid in said container.

* * * * *